Aug. 23, 1955   D. M. HASKELL   2,716,120
SEPARATION OF ALKENYLPYRIDINES FROM ALKYLPYRIDINES
Filed Jan. 3, 1952
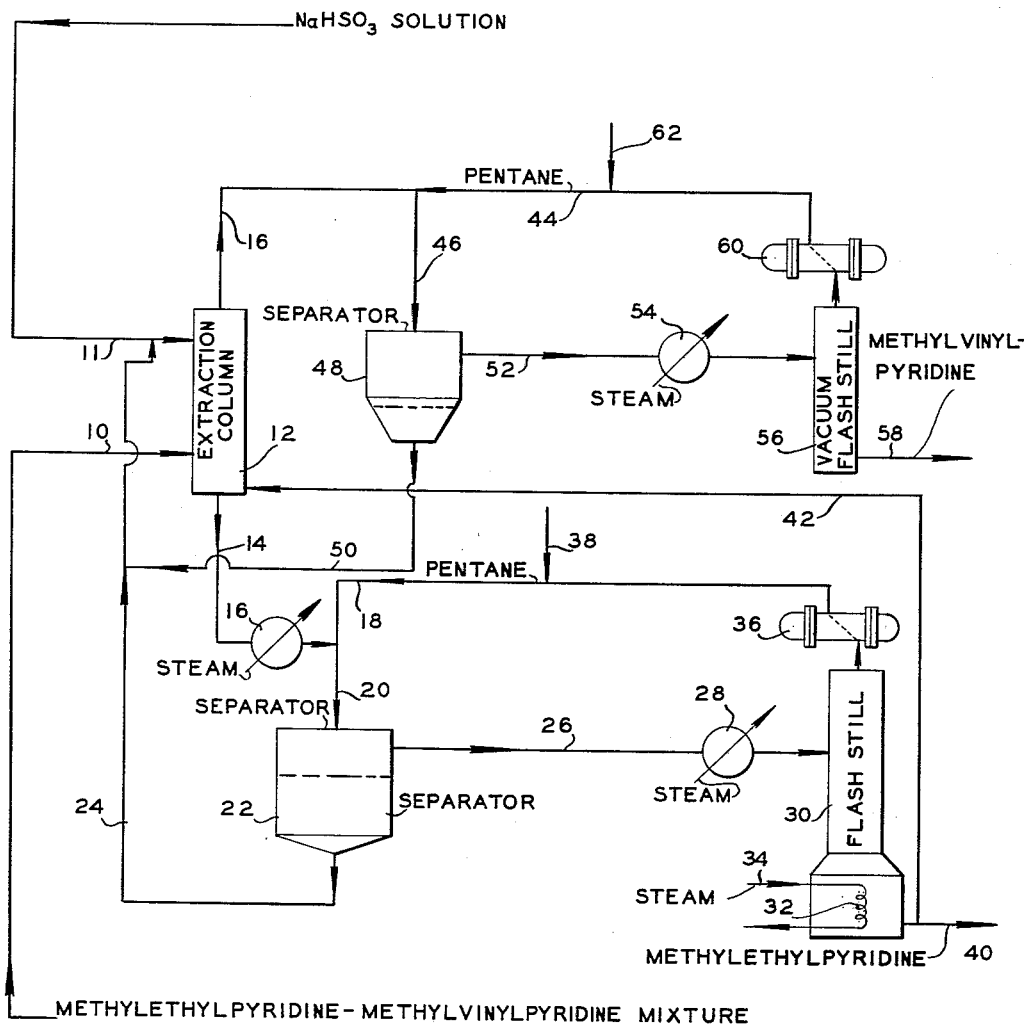
INVENTOR.
DONALD M. HASKELL
BY Hudson & Young

United States Patent Office 2,716,120
Patented Aug. 23, 1955

2,716,120

SEPARATION OF ALKENYLPYRIDINES FROM ALKYLPYRIDINES

Donald M. Haskell, Bartlesville, Okla., assignor to Phillips Petroleum Company, a corporation of Delaware Application January 3, 1952, Serial No. 264,811

11 Claims. (Cl. 260—290)

This invention relates to the separation of alkylpyridines from alkenylpyridines. In preferred embodiments the invention pertains to the purification of vinylpyridines from admixture with ethylpyridine.

The production of alkenylpyridines, especially vinylpyridines, has recently become of much industrial importance. Vinylpyridines can be prepared by condensation of formaldehyde with 2-and 4-alkylpyridines to form the monomethylol compounds followed by dehydration of same to produce corresponding vinylpyridines or substituted vinylpyridines. A more direct procedure, and one which will probably be the most important industrially, is the direct catalytic dehydrogenation of alkylpyridines to the corresponding alkenylpyridines. Thus, for example, 2-methyl-5-ethylpyridine can be efficiently dehydrogenated to produce the corresponding 2-methyl-5-vinylpyridine. This can be done, for example, by passing an admixture of from 2 to 15 weights of steam per weight of 2-methyl-5-ethylpyridine at a temperature within the range of 1000 to 1300° F., approximately atmospheric pressure, and a space velocity of 1 to 5 liquid volumes 2-methyl-5-ethylpyridine charged per volume of catalyst per hour, over a catalyst exemplified by one composed of 93 per cent iron oxide, 5 per cent chromium oxide, and 2 per cent potassium hydroxide, as described in further detail in the copending application of John E. Mahan Serial No. 244,469 filed August 30, 1951. The dehydrogenation effluent contains in addition to hydrogen, principally unchanged 2-methyl-5-ethylpyridine and 2-methyl-5-vinylpyridine product. Also present are small quantities of pyridine, 2-picoline, 3-picoline, 2,5-lutidine, 3-ethylpyridine and 3-vinylpyridine.

Purification of vinylpyridines contained in this or other mixtures presents many difficulties. These arise because of the great ease with which vinylpyridines polymerize, the closeness of boiling points between vinylpyridines and the corresponding ethylpyridines, and the formation of water azeotropes and other difficultly separable fractions on fractional distillation of such mixtures.

An object of this invention is to separate alkenylpyridines from alkylpyridines. Another object of the invention is to purify vinylpyridines. A further object is to separate an alkenylpyridine from admixture with the corresponding alkylpyridine. Yet another object is to effect the separation and purification referred to while minimizing polymerization of the alkenylpyridine. A still further object is to purify 2-methyl-5-vinylpyridine. Further objects and advantages of the invention will be apparent to one skilled in the art from the accompanying disclosure and discussion.

I have discovered that an excellent separation can be made of alkenylpyridines from alkylpyridines by contacting an admixture of same with an aqueous acid solution having a pH of less than 7 but no less than 2. I have found that the alkylpyridine is much more soluble than the corresponding alkenylpyridine in aqueous acid solutions having the characteristics just defined, and therefore a separation can be made between the two. Preferably, I flow the pyridine mixture, by which I mean the organic mixture containing at least an alkylpyridine and the corresponding alkenylpyridine, countercurrently to an aqueous solution containing from 5 to 35 weight per cent of an acid and having a pH between 2.5 and 4.5 prior to contact with said pyridine mixture. The alkylpyridine is selectively dissolved in the aqueous solution so that an aqueous solution rich in alkylpyridine is obtained on the one hand and a pyridine material rich in alkenylpyridine is obtained on the other hand. The purification can be carried to whatever extent is desired, so that essentially pure alkenylpyridine can be separated as one product and essentially pure alkylpyridine can be recovered as the other product.

This invention is applicable to alkylpyridines containing at least one alkyl group having at least 2 carbon atoms, and to alkenylpyridines corresponding thereto. Di-, tri-, and tetraalkyl pyridines with the alkyl substituents being present in various positions on the pyridine nucleus can be separated from corresponding alkenylpyridines wherein the double bond can be in a vinyl group or in the alpha position of the various possible positions in carbon chains of three and more carbon atoms in length. 2-methyl-5-vinylpyridine and 2-methyl-5-ethylpyridine make up one group which it is frequently desired to separate in accordance with this invention. Other examples of alkylpyridines which can be separated from alkenylpyridines are: 2-ethyl-4-ethylpyridine, 2-ethylpyridine, 2-ethyl-5-ethylpyridine, 3-ethylpyridine, 3-propylpyridine, 2-n-amylpyridine. Suitable alkenylpyridines which can be purified in accordance with the invention are, for example, 2-vinyl-4-ethylpyridine, 2-ethyl-4-vinylpyridine, 2-vinylpyridine, 3-propenylpyridine, 2-n-amylene pyridine. The various alkyl and alkenylpyridines can have non-interfering groups attached to the pyridine nucleus, for example a chlorine or nitro group substituted on a carbon atom of the nucleus. Usually the invention is applied to those alkyl and alkenylpyridines containing a total of not over 10 carbon atoms in side chains and best results are customarily obtained with mixtures containing a monovinyl or monopropenyl pyridine and the corresponding ethyl or propyl pyridine, with or without one or two methyl groups thereon.

As stated heretofore the pH of the aqueous extraction solution must be below 7 to obtain the selective separation action of this invention. It should be no lower than 2 in order to minimize polymerization of the vinyl compounds, corrosion of equipment, and difficulty of recovering the pyridine compounds from the acid solution. A pH within the range of 2 to 5 is almost always used, and most frequently a pH within the range of 2.5 to 4.5. I have found that a pH of about 3.5, varying within the range of 3.2 to 3.8, gives optimum results in most cases. The acid solution should be buffered if necessary to bring it to the desired pH range with any particular acid and any given concentration of acid.

By acid I include both the mineral and the organic acids, and acid salts thereof, i. e. salts containing at least one hydrogen atom ionizable to give hydrogen ions in aqueous solution. By way of example can be mentioned sulfurous, sulfuric, phosphoric, phorphorous, hydrochloric, citric, oxalic acids, sodium bisulfite, sodium bisulfate, ammonium bisulfite, ammonium bisulfate, and acid salts of any of the polybasic acids especially those mentioned above.

Solution of these acids can be buffered if desired by known means, including addition of less than the equivalent amount of a base, e. g. NaOH or NH3, and/or addition of salts. Aqueous solutions of potassium acid tartrate, potassium acid phthalate, or sodium acid succinate can be used alone or with added acid as extracting agents, and will have good resistance to pH change, i. e. will be well buffered. In a continuous separation process wherein the acid solution is returned to the extraction after removal of alkylpyridines therefrom, the removal step can be operated so that the acid solution retains some pyridine compounds which will serve to buffer the solution.

The extraction temperature man be varied over a considerable range while still retaining the advantages of this invention. Ordinarily a temperature from 32 to 120° F. is satisfactory. Lower temperatures, although operable so long as freezing is avoided, are unnecessary. Temperatures above 120° F. are operable but reduce the solubility. A preferred temperature range is 80 to 110° F.

Dissolved alkylpyridines can be recovered from the aqueous solution by a variety of methods. While neutralization with a base, for example NaOH, will liberate the pyridine bases, this is hard to justify economically. The solution can be heated sufficiently to liberate the pyridine bases which are then recovered by distillation. However, I prefer to subject the solution of alkylpyridines in the aqueous acid solution to liquid-liquid contact with an organic, preferably a hydrocarbon liquid, whereby, if the pH of the original acid solution was not too low (say not lower than 3 to 3.5), the alkylpyridines transfer from the aqueous to the hydrocarbon phase. The latter is then preferably distilled to separate hydrocarbon from alkylpyridine product. A suitable hydrocarbon is one or more of the lower paraffins such as pentane, propane, n-octane, 2,2,4-trimethylpentane, etc. However, open chain olefins, cycloparaffins and cycloolefins and aromatics are also useable, as other organic liquids, for example chlorinated hydrocarbons or other organic liquids sufficiently immiscible with the aqueous phase. This recovery step by extracting the aqueous solution with a hydrocarbon can be effected within the same range of temperatures as the step of extracting the mixed pyridines with aqueous acid, or can be carried out at somewhat higher temperatures, for example at 200° F.

Since methods and apparatus for obtaining intimate contact of two at least partially immiscible liquids are well known to the art, no detailed description thereof is required. By way of example, a two-inch diameter 8-foot tall spray-type extraction column has been used very successfully in separating 2-methyl-5-ethylpyridine from 2-methyl-5-vinylpyridine by extraction with a 20 weight percent sodium bisulfite aqueous solution. A flow ratio of 20 pounds of the aqueous sodium bisulfite solvent per pound of mixed pyridines was used. The column capacity was about 400 gallons solvent per hour per square foot, and an efficiency of about one theoretical stage was obtained. In such process wherein a mixture obtained by the catalytic dehydrogenation of 2-methyl-5-ethylpyridine is treated, picolines contained therein go into solution along with 2-methyl-5-ethylpyridine, while 3-vinylpyridine becomes distributed part in the aqueous phase and part with the undissolved 2-methyl-5-vinylpyridine.

The accompanying drawing shows diagrammatically one arrangement of apparatus elements and flow of materials therethrough suitable for practicing the invention in a preferred modification. Various auxiliary items of equipment such as valves, pumps, etc. can be supplied by those skilled in the art and have therefore not been shown. It will be apparent that numerous modifications can be made of the specific details shown without departing from the invention.

A mixture of 2-methyl-5-vinylpyridine and 2-methyl-5-ethylpyridine to be separated is introduced via line 10 into extraction column 12 which is representative of any suitable liquid-liquid contacting equipment. Into the top of column 12 is passed an aqueous solution of sodium bisulfite from line 11, which flows downwardly through the column and thereby preferentially dissolves methylethylpyridine. Resulting methylethylpyridine-rich aqueous sodium bisulfite solution is withdrawn from the bottom of column 12 via line 14. Undissolved methylvinylpyridine, which contains dissolved therein some of the aqueous sodium bisulfite, is withdrawn from the top of column 12 via line 16.

The methylethylpyridine solution in line 14 can if desired be passed through heater 16 and is then admixed with liquid normal pentane, which exemplifies any of the various organic liquids mentioned hereinabove, and which is flowing in line 18. The resulting admixture passes via line 20 into separator 22 wherein aqueous sodium bisulfite phase, at least partially denuded of methylethylpyridine, separates as a heavy layer and is returned via lines 24 and 11 to the top of extraction column 12 for reuse. The upper organic layer in separator 22 contains methylethylpyridine which has been recovered from the bisulfite solution by solution in the pentane, and is withdrawn from separator 22 via line 26, passed through heater 28, and thereafter into the flash still 30, which is heated at the bottom by steam introduced to the reboiler 32 via line 34. Pentane is recovered overhead and after passing through condenser 36 is returned via line 18 for reuse. Make-up pentane can be introduced through line 38. Methylethylpyridine product is recovered through line 40. A portion thereof is taken through line 42 and passed into the bottom of extraction column 12 as a reflux, thus greatly increasing the purity of the product.

The lighter phase withdrawn from the top of extractor 12 through line 16 has as stated, some aqueous sodium bisulfite solution dissolved therein. For the purpose of separating this aqueous material from the methylvinylpyridine, pentane from line 44 is admixed with the material in line 16 and the resulting mixture passed through line 46 into separator 48. Aqueous sodium bisulfite solution thus knocked out of solution in methylvinylpyridine is withdrawn from the bottom of separator 48 and returned via lines 50, 24 and 11 to extractor 12 for reuse. The light organic phase is withdrawn from separator 48 through line 52, heated in heater 54, and flashed in vacuum still 56 so that pentane is recovered overhead and methylvinylpyridine product is recovered via line 58. The pentane thus separated is passed through condenser 60 and then returned through line 44 for the use indicated. Make-up pentane can be added from line 62.

The following data are representative of that obtained on the various components of a system composed of 2-methyl-5-ethylpyridine (2M5EP), 2-methyl-5-vinylpyridine (2M5VP), and aqueous sodium bisulfite.

*Solubility 2M5EP and 2M5VP in aqueous* $NaHS_3$—$H_2O$ *solution (solvent)*

[At 30° C.]

| Weight Percent NaHSO₃ in Solvent | Solubilities | |
|---|---|---|
| | 2M5EP, Weight Percent | 2M5VP, Weight Percent |
| 9.59 | 4.39 | 2.63 |
| 16.52 | 5.48 | 3.19 |
| 39.30 | 5.66 | 3.10 |

*Ternary equilibria (single stage contacting)*

[2M5EP-2M5VP—18.8 weight percent NaHSO₃ solution at 30° C.]

| | Composition, Weight Percent 2M5VP, Solvent-free Basis | | Selectivity [1] |
|---|---|---|---|
| | Raffinate | Extract | |
| Run 1 | 35.2 | 14.5 | 3.20 |
| Run 2 | 80.8 | 57.8 | 3.07 |

[1] $\text{Selectivity} = \dfrac{\text{Percent A in extract} \times \text{Percent B in raffinate}}{\text{Percent B in extract} \times \text{Percent A in raffinate}}$

*Solubility NaHSO₃—H₂O solution in 2M5EP and 2M5VP*

[At 30° C.]

| Weight Percent NaHSO₃ in Solvent | Solubilities | |
|---|---|---|
| | In 2M5EP, Weight Percent NaHSO₃ Solution | In 2M5VP, Weight Percent NaHSO₃ Solution |
| 12.7 | 11.3 | 9.7 |

From the foregoing data the following system has been calculated for separating 350 pounds per hour of a 50–50 weight per cent 2M5VP–2M5EP mixture into its components in a purity of 98 weight per cent.

The limiting conditions were found to be:

Minimum reflux ratio 2.19 (based on extract product).
Minimum solvent to feed ratio 18.2 lbs./lb.
Minimum stages 7.

At 120% of minimum reflux the conditions are:

Reflux ratio 2.63.
Solvent feed ratio 21.8 lbs./lb.
Stages 13.6.

The primary extractor is an eight inch diameter packed column 40 feet tall. It is operated at a solvent to organic feed ratio of 21.8 pounds per pound and a reflux ratio of 2.6 to 1 based on the 2M5EP product. The solvent is an 18.8 weight per cent sodium bisulphite solution. The extract stripper is a ten inch diameter packed column 30 feet tall in which the 2M5EP is stripped from the solvent phase by countercurrent contacting with pentane. A flow ratio of 4.7 pounds of n-pentane per pound of organic feed to the primary extractor is required. The 2M5EP–NC₅ fractionator is a two feet diameter packed column 20 feet tall in which the n-pentane is recovered from the 2M5EP product. The raffinate stripper is a three inch diameter packed column 30 feet tall in which the 2M5VP product is stripped from the dissolved solvent by countercurrent contacting with n-pentane. A flow ratio of 0.22 pound of n-pentane per pound of organic feed to the primary extractor is required. The 2M5VP–NC₅ fractionator is a 16 inch diameter packed column in which the n-pentane is recovered from the 2M5VP product.

The following data are given to show the general order of magnitude of solubility to be expected when extracting a mixture containing 2-methyl-5-ethylpyridine with a 15 per cent aqueous sodium bisulfite solution. The aqueous solution was first buffered to give different pH's by titrating with sodium hydroxide or with sulfur dioxide. The solubility data were obtained at 110° F.

*Solubility of 2-methyl-5-ethylpyridine in 15% aqueous sodium bisulfite*

| pH | Soly. 2M5EP (Weight percent) |
|---|---|
| 8.4 | 0.1 |
| 6.4 | 1.0 |
| 4.8 | 3.25 |
| 3.5 | 10.0 |

Information was obtained on the solubility of 2-methyl-5-ethylpyridine at 100° F. in aqueous solutions of various acids.

*Solubility of 2M5EP in aqueous solutions of acids*

[At 100° F.]

| | Conc. acid, weight percent | Soly. 2M5EP, weight percent |
|---|---|---|
| H₂O | | 1.0 |
| H₃PO₄ | 4 | 6.8 |
| | 8 | 11.7 |
| | 16 | 16.9 |
| Citric | 7.5 | 13.9 |
| | 15 | 23.2 |
| Sulfuric | 4 | 12.3 |
| | 8.3 | 20.8 |
| | 16.5 | 32.9 |

The invention has been described with respect to various preferred embodiments thereof. However, numerous variations can be made in the details herein given without departing from the invention.

I claim:

1. A method of separating an alkylpyridine containing at least one alkyl group having at least two carbon atoms and a total of not over ten carbon atoms in side chains from admixture with an alkenylpyridine containing at least one alkenyl group having at least two carbon atoms and a total of not over ten carbon atoms in side chains, said alkenylpyridine having the double bond on an alpha carbon atom which comprises contacting same with an aqueous solution more acid than said pyridine and having a pH less than 7 but not less than 2, and separating resulting organic and aqueous phases from each other, the latter being enriched in said alkylpyridine and the former being enriched in said alkenylpyridine.

2. A method according to claim 1 wherein said aqueous solution contains an inorganic acid.

3. A method according to claim 1 wherein said aqueous solution contains an acid salt.

4. A method of resolving a mixture of 2-methyl-5-vinylpyridine and 2-methyl-5-ethylpyridine which comprises contacting same with an aqueous solution of sodium bisulfite having a pH within the range of 2.5 to 4.5 and separating resulting organic and aqueous phases.

5. A method of separating an alkylpyridine containing at least one alkyl group having at least two carbon atoms and a total of not over ten carbon atoms in side chains from admixture with an alkenylpyridine containing at least one alkenyl group having at least two carbon atoms and a total of not over ten carbon atoms in side chains, said alkenylpyridine having the double bond on an alpha carbon atom which comprises contacting same with an aqueous solution containing from 5 to 35 weight per cent of an acid having a pH less than 7 but not less than 2, separating an organic phase enriched in said alkenylpyridine from an aqueous phase enriched in said alkylpyridine, contacting said separated aqueous phase with a liquid organic solvent at least partially immiscible therewith thereby transferring alkylpyridine from aqueous phase to organic solvent, and recovering alkylpyridine from said organic solvent.

6. A method according to claim 5 wherein said organic solvent is a liquid paraffin hydrocarbon.

7. A method of separating an alkylpyridine containing at least one alkyl group having at least two carbon atoms and a total of not over ten carbon atoms in side chains from admixture with a corresponding alkenylpyridine having the double bond on an alpha carbon atom which comprises countercurrently extracting such a mixture with an acidic aqueous solution having a pH less than 7 but not less than 2 thereby preferentially dissolving said alkylpyridine.

8. A process which comprises contacting a mixture of an ethylpyridine and the corresponding vinylpyridine with an aqueous solution of an acid salt having a pH less than 7 but not less than 2 at a temperature within the range of 32 to 120° F., and separating resulting organic and aqueous phases from each other, the latter being enriched in said ethylpyridine and the former being enriched in said vinylpyridine.

9. A method of separating an alkylpyridine containing at least one alkyl group having at least two carbon atoms and a total of not over ten carbon atoms in side chains from admixture with an alkenylpyridine containing at least one alkenyl group having at least two carbon atoms and a total of not over ten carbon atoms in side chains, said alkenylpyridine having the double bond on an alpha carbon atom which comprises flowing same in intimate countercurrent contact with an acidic aqueous solution having a pH less than 7 but not less than 2, recovering an aqueous phase enriched in said alkylpyridine and contacting same with a liquid hydrocarbon under conditions effecting transfer of said alkylpyridine from said aqueous phase to said hydrocarbon, subjecting resulting hydrocarbon solution to distillation to separate hydrocarbon from alkylpyridine product, returning a portion of said product to said countercurrent contacting at a point near the point of withdrawal of aqueous phase therefrom, and returning recovered hydrocarbon to the second mentioned contacting step.

10. A method according to claim 9 wherein said second mentioned contacting step is effected in such a manner as to leave residual alkylpyridine contained in acidic aqueous solution and recycling same to said first named contacting step wherein retained alkylpyridine buffers the acidic aqueous solution within a pH range of 2.5 and 4.5.

11. A method of separating an alkylpyridine containing at least one alkyl group having at least two carbon atoms and a total of not over ten carbon atoms in side chains from admixture with an alkenylpyridine containing at least one alkenyl group having at least two carbon atoms and a total of not over ten carbon atoms in side chains, said alkenylpyridine having the double bond on an alpha carbon atom which comprises flowing same in intimate countercurrent contact with an acidic aqueous solution having a pH less than 7 but not less than 2, recovering an aqueous phase enriched in said alkylpyridine and contacting same with a liquid hydrocarbon under conditions effecting transfer of said alkylpyridine from said aqueous phase to said hydrocarbon, subjecting resulting hydrocarbon solution to distillation to separate hydrocarbon from alkylpyridine product, returning a portion of said product to said countercurrent contacting at a point near the point of withdrawal of aqueous phase therefrom, returning recovered hydrocarbon to the second mentioned contacting step, recovering a phase enriched in said alkenylpyridine, contacting same with a liquid hydrocarbon under conditions effecting transfer of said alkenylpyridine to said hydrocarbon, and recovering said alkenylpyridine from said last-mentioned hydrocarbon.

References Cited in the file of this patent
UNITED STATES PATENTS

| | | |
|---|---|---|
| 2,288,281 | Huijser et al. | June 30, 1942 |
| 2,309,324 | McAllister et al. | Jan. 26, 1943 |
| 2,611,769 | Hays | Sept. 23, 1952 |